(12) United States Patent
Benjey

(10) Patent No.: US 6,282,953 B1
(45) Date of Patent: Sep. 4, 2001

(54) SOLID STATE FUEL LEVEL SENSING

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/570,840

(22) Filed: May 12, 2000

(51) Int. Cl.[7] ............................. G01N 9/12; G01N 9/00; G01F 23/00; G01F 17/00
(52) U.S. Cl. ..................... 73/438; 73/32; 73/299; 73/149
(58) Field of Search ............................ 73/64.44, 64.45, 73/299, 291, 290 R, 32 R, 438, 149, 300, 301; 702/152

(56) References Cited

U.S. PATENT DOCUMENTS

| | | | |
|---|---|---|---|
| 4,043,193 | * | 8/1977 | Bailey .................................... 73/438 |
| 4,625,553 | * | 12/1986 | Charter ................................... 73/438 |
| 4,949,572 | * | 8/1990 | Wilen et al. ............................. 73/53 |
| 5,157,968 | * | 10/1992 | Zfira ...................................... 73/149 |
| 5,261,276 | * | 11/1993 | Gifford .................................. 73/299 |
| 5,351,725 | * | 10/1994 | Suthergreen et al. ................... 141/1 |
| 5,604,315 | * | 2/1997 | Briefer et al. ....................... 73/861.49 |
| 5,900,547 | * | 5/1999 | Bartkiewicz ........................... 73/447 |

* cited by examiner

Primary Examiner—Hezron Williams
Assistant Examiner—Katina M Wilson
(74) Attorney, Agent, or Firm—Roger A. Johnston

(57) ABSTRACT

A pair of solid state pressure sensors are disposed near the bottom of a fuel tank vertically spaced with one a unit distance above the other. A third solid state sensor is disposed in the tank at the highest point under the upper wall. The apparent hydrostatic pressure is computed from the difference in pressure sensed by the highest and lowest sensors. The density is computed from the difference in pressure sensed by the pair of sensors near the tank bottom; and, the difference normalized for the vertical distance therebetween. The liquid level height is then computed from computed density and apparent pressure. The reserve volume of liquid fuel is then found for the computed height from a lookup table of values of liquid height and corresponding liquid volume.

9 Claims, 2 Drawing Sheets

SOLID STATE FUEL LEVEL SENSING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to techniques for sensing and indicating the fuel reserve in a tank and particularly vehicle fuel tanks containing volatile fuel such as gasoline or mixtures of gasoline and methanol. Where vapor pressure is accumulated in the tank above the liquid fuel level, and particularly at elevated ambient temperature conditions in closed fuel vapor vent systems, the increased vapor pressure can significantly increase the effective density of the fuel. Where a float type sensor is employed for sending a fuel level signal from the tank to a remote indicator for the vehicle operator, the increased buoyancy, without any change in the liquid level of the fuel in the tank, can result in an increased buoyancy force on the float raising the float and thus providing an erroneous liquid level signal. Furthermore, float type sensors are unique or distinct for different fuel tank configurations, and thus require a variety of sensors in inventory for the various configurations in a manufacturers line of vehicle products, which is quite cumbersome and costly in mass production.

Accordingly, it has been desired to provide a simple, low cost yet effective technique or system for sensing the level of volatile liquid fuel in a fuel tank and particularly a fuel tank employed on a motor vehicle which will provide an accurate indication of the fuel level irrespective of the change in ambient temperature conditions and vapor pressure in the tank. It has further been desired to provide a single design liquid level sensor which can accommodate different fuel tank depth configurations.

BRIEF SUMMARY OF THE INVENTION

The present invention provides a system for indicating the fuel reserve in a tank by means of solid state sensors disposed within the fuel tank and eliminates the need for a float type device for sensing the liquid level of the remaining fuel in the tank. The system of the present invention employs a pair of solid state sensors disposed at a predetermined vertical increment and located near the bottom of the tank, with a third sensor disposed near the top of the tank for sensing the vapor pressure above the liquid level within the tank.

The system computes the apparent hydrostatic pressure by subtracting the measured vapor pressure from the pressure reading of the lowest sensor in the tank. The difference in the pressure readings for the two sensors located near the bottom of the tank is then normalized for the known distance between the sensors to enable a calculation of the liquid fuel density. From the computed apparent hydrostatic pressure and the computed density, the height of the liquid level in the tank is then computed; and, from a lookup table of fluid level height as a function of the tank volume at various liquid heights, the volume of fuel reserve is computed and an indication thereof provided to a remote indicator for the vehicle operator. In the event that the fuel level computed indicates that the liquid fuel has dropped below the level of the upper of the two sensors near the bottom of the tank, the system proceeds to set the density at the previously determined value and computes the fuel level based on a fixed density. In the event of a loss of signal to the remote indicator, the system may be reset by the vehicle operator upon refueling.

The present invention thus provides a simple and relatively low cost system for measuring the fuel reserve in a fuel tank without the need for a float type sensor, and is based upon pressure readings from a pair of sensors disposed near the bottom of the tank spaced at a predetermined vertical increment and a third sensor disposed near the top of the tank for reading the vapor pressure above the liquid fuel level. The present invention thus provides a system particularly useful for closed vent systems employed in fuel tanks in high volume, mass produced motor vehicles. The present invention provides a single fuel level sensor which can be used in a variety of tank configurations and depths.

DETAILED DESCRIPTION OF THE INVENTION

Figure 1:
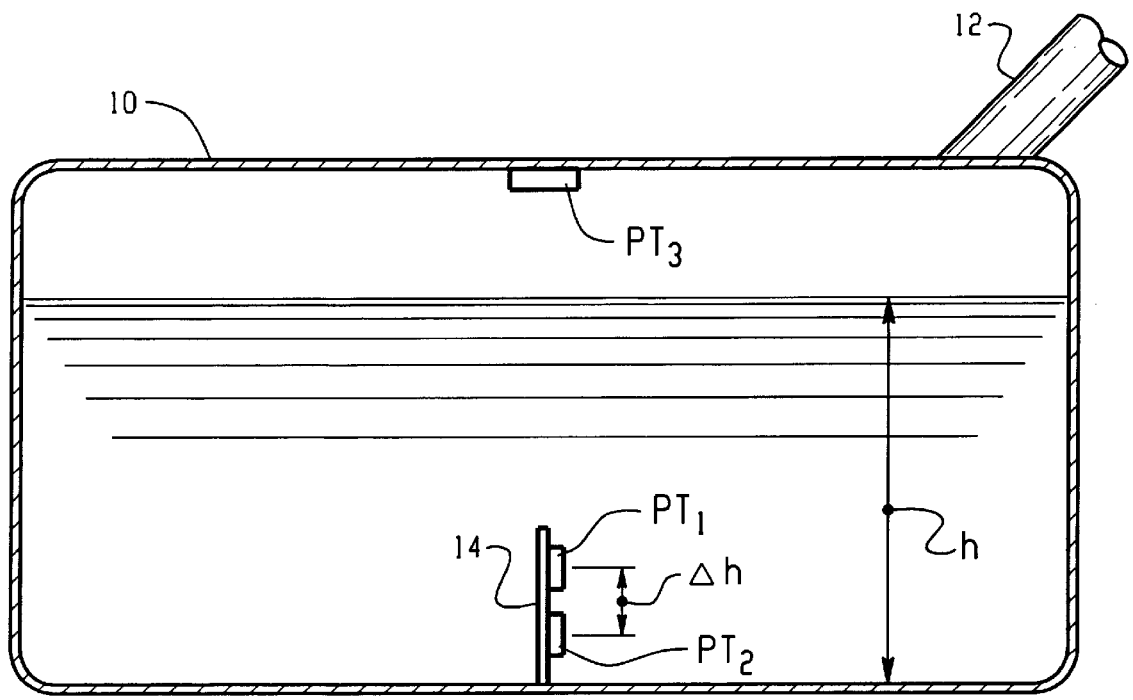
FIG. 1 is a cross-section of a fuel tank indicating the placement of the sensors of the present invention.

Referring to FIG. 1, the system is shown as implemented in a typical vehicle fuel tank 10 having a filler tube or neck 12 and filled with volatile liquid fuel to a depth denoted by reference character "h". A lower solid state pressure sensor $PT_2$ is disposed closely adjacent the bottom of the tank with a second sensor $PT_1$ supported on a bracket 14 a unit distance $\Delta h$ above sensor $PT_2$. In the present practice of the invention for liquid level measurements in inches, density in pounds per cubic inch, $\Delta h$ is set at one inch. A third sensor $PT_3$ is disposed on the underside of the upper wall of the fuel tank at its highest point for sensing vapor pressure above the liquid level of the fuel.

Figure 2:
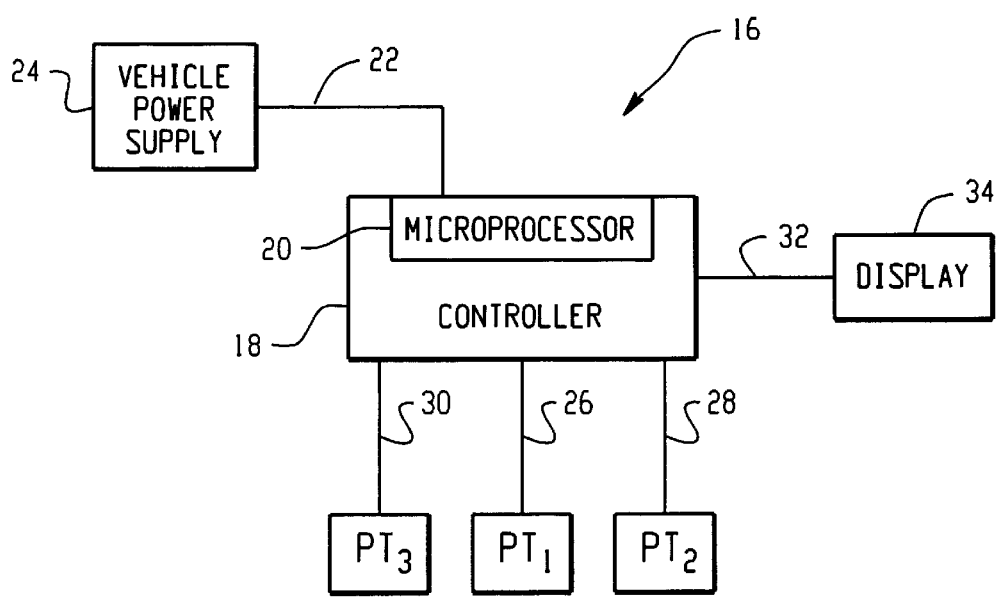
FIG. 2 is a block diagram of the electrical components of the present invention; and, FIG. 3 is a flow diagram of the algorithm of the controller of the system of FIG. 2.

Referring to FIG. 2, an electrical schematic of the system of the present invention is indicated generally at 16 and includes a controller 18 having embedded therein a microprocessor 20 and the controller 18 is connected along line 22 to the vehicle power supply 24.

Pressure sensor $PT_1$ is connected to the controller 18 along line 26; sensor $PT_2$ connected to controller 18 along line 28; and, sensor $PT_3$ connected to the controller 18 along line 30. It will be understood that the electrical leads within the tank 10 corresponding to the lines 26, 28, 30 have been omitted for simplicity of illustration in FIG. 1. The controller provides an output along line 32 to a remote display 34 which in the application to a motor vehicle would comprise the fuel level indicator on the operator's instrument panel.

Figure 3:
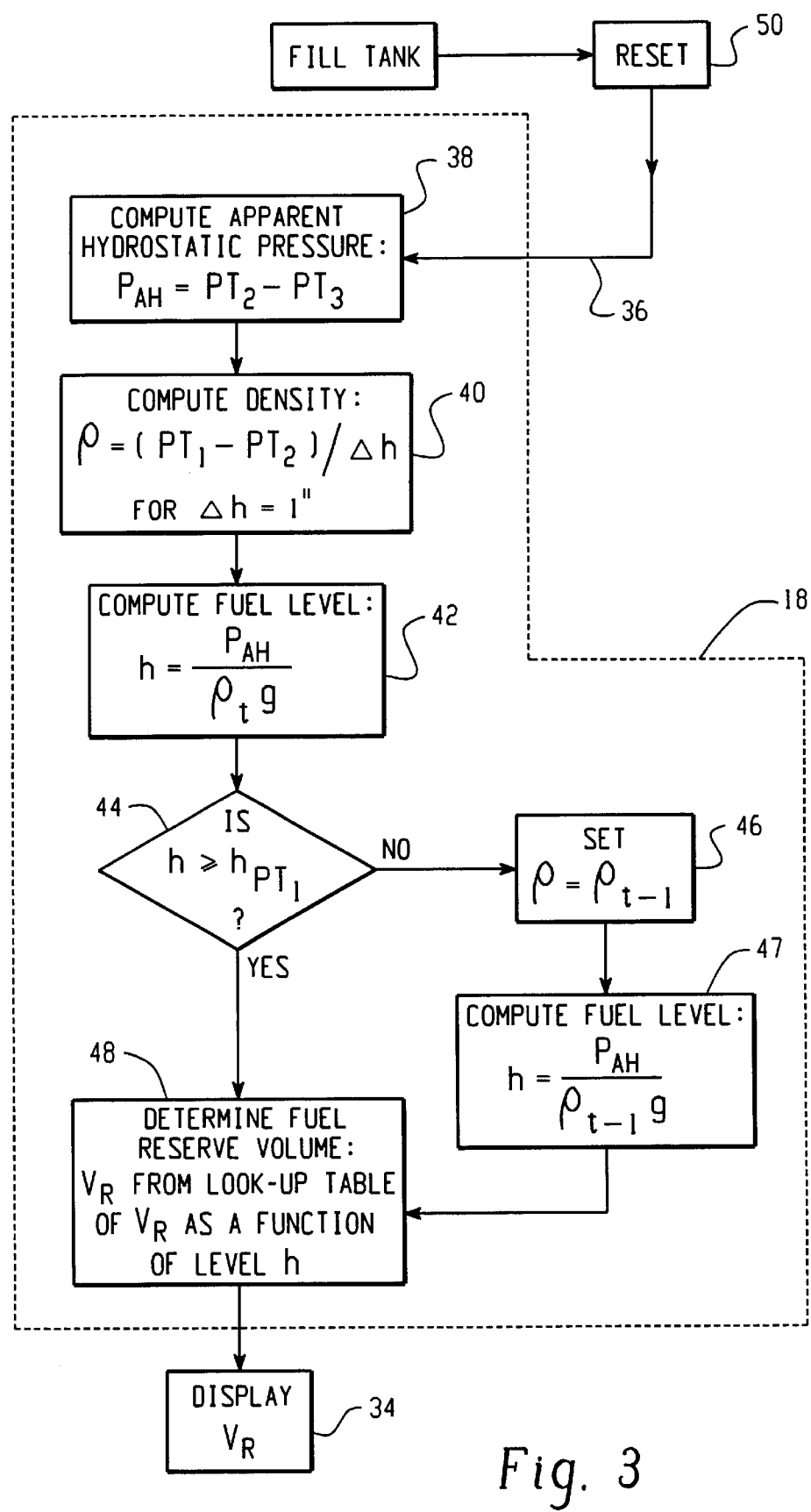

Referring to FIG. 3, the operating program of the controller 18 is illustrated where, upon receiving a reset signal along line 36, the computer within controller 18 computes at step 38 the apparent hydrostatic pressure PAH from the difference in the signals from $PT_2$ and $PT_3$. The system then proceeds to step 40 to compute the density by normalizing for the vertical distance therebetween the pressure readings of sensors $PT_1$ and $PT_2$ disposed in the liquid. The system then proceeds to step 42 and computes the fuel level h using the density $\rho_t$ computed from step 40 and the apparent hydrostatic pressure $P_{AH}$ computed at step 38.

The system then proceeds to step 44 and inquires as to whether the fuel level h is equal to or greater than the height of $PT_1$,; and, if the liquid level is below $PT_1$, i.e., the determination at step 44 is negative, the system proceeds to step 46 uses the density previously calculated and proceeds to step 47. At step 47, the fuel level is again computed and the system proceeds to step 48. If, however, the determination of step 44 is affirmative that the fuel level is above $PT_1$, the system proceeds to step 48 and determines the fuel reserve volume $V_R$ from a lookup table of values of $V_R$ as a function of values of fuel level h for the known tank configuration.

Upon refueling and filling the tank, the system is reset at step 50 which may comprise a manual reset by the vehicle operator.

The present invention thus provides for an accurate indication of the volume of reserve fuel in a tank computed from signal outputs from solid state sensors disposed in the tank. A pair of sensors located near the bottom of the tank and vertically spaced a predetermined increment provide outputs from which the fuel density may be computed. The difference between the lower sensor reading in the bottom of the tank and a third sensor disposed at the highest point in the tank for sensing vapor pressure above the liquid provides a basis for computing the apparent hydrostatic pressure in the tank which is then employed for computing the actual liquid level from the previously computed density. The reserve volume of fuel is then obtained from a lookup table of tank volume at varied levels of liquid fuel in the tank. The present invention thus provides a relatively low cost and reliable alternative to a mechanical float type level sensor heretofore widely employed in fuel tanks for motor vehicles.

Although the invention has hereinabove been described with respect to the illustrated embodiments, it will be understood that the invention is capable of modification and variation and is limited only by the following claims.

What is claimed is:

1. A liquid volume monitoring system for a motor vehicle fuel tank comprising:

(a) a first pressure sensor disposed on the upper wall of the fuel tank for sensing fuel vapor dome pressure;

(b) a second pressure sensor disposed on the bottom of the tank for sensing the hydrostatic pressure of the liquid in the tank;

(c) a third pressure sensor disposed a certain distance above said second sensor for sensing hydrostatic pressure at said certain distance;

(d) signal processing circuitry including a computer operatively connected to said sensors and receiving output signals therefrom, said circuitry operative to subtract the output of said first sensor from the output of said second sensor to determine apparent hydrostatic pressure of the liquid in said tank; and, said circuitry operative to compare the output of the third sensor with the output of said second sensor and to compute the density of said liquid;

(e) said computer further operative to compute the actual level of liquid in said tank from a look-up table of values of density as a function of determined apparent hydrostatic pressure at a given distance; wherein said computer is operative to (i) compute the volume of liquid in said tank from said level signal and known tank dimensions stored in said computer; and, (ii) output a signal indicative of said computed volume.

2. The system defined in claim 1 wherein said pressure sensors comprise solid state transducers.

3. The system defined in claim 1 wherein said third sensor is disposed about one inch (25.4 mm) above said second sensor.

4. A method of monitoring the amount of liquid in a vehicle fuel tank comprising:

(a) disposing a first pressure sensor at the top of the tank and sensing fuel vapor pressure and generating a first sensor signal indicative of the sensed pressure;

(b) disposing a second pressure sensor at the bottom of the tank and sensing the hydrostatic pressure of the liquid in the tank and generating a second sensor signal indicative of the sensed pressure;

(c) disposing a third pressure sensor in said tank and sensing the hydrostatic pressure of the liquid at a certain distance above said second sensor and generating a third sensor signal indicative of the sensed pressure at said certain distance;

(d) providing signal processing circuitry including a computer on the vehicle and connecting said circuitry to receive said first, second and third sensor signals;

(e) subtracting said first sensor signal from said second sensor signal and computing the apparent hydrostatic pressure of the liquid in said tank;

(f) comparing said second and third sensor signals and computing the density of the liquid in the tank based on said certain distance;

(g) determining the actual liquid level in the tank at the computed density and apparent hydrostatic pressure from a look-up table of values of liquid level as a function of density and apparent hydrostatic pressure;

(h) generating an output level signal indicative of said actual fluid level;

(i) computing actual liquid volume from said level signal and known tank dimensions stored in said computer.

5. The method defined in claim 4, wherein said step of disposing first, second and third sensors includes disposing solid state transducers.

6. The method defined in claim 4, wherein said step of disposing said third sensor comprises disposing said third sensor about one inch (25.4 mm) above said second sensor.

7. The method defined in claim 4, further comprising generating a fuel reserve signal indicative of said computed volume and displaying said computed volume to the vehicle operator as the fuel reserve.

8. The method defined in claim 4, wherein said step of comparing said second and third signals includes disabling said comparing when the fuel level is below said certain distance.

9. The method defined in claim 4, wherein said step of comparing said second and third signals includes disabling said comparing when said fuel level is below said certain distance and said step of computing includes storing the last computed value until the tank is filled and the fuel level raised above said certain distance.

\* \* \* \* \*